(12) United States Patent
Wang et al.

(10) Patent No.: US 7,779,679 B2
(45) Date of Patent: Aug. 24, 2010

(54) FUEL SYSTEM DIAGNOSTICS BY ANALYZING CYLINDER PRESSURE SIGNAL

(75) Inventors: Yue-Yun Wang, Troy, MI (US);
Ibrahim Haskara, Macomb, MI (US);
Chol-Bum M Kweon, Rochester, MI (US); Frederic Anton Matekunas, Troy, MI (US); Paul Anthony Battiston, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 318 days.

(21) Appl. No.: 12/102,129

(22) Filed: Apr. 14, 2008

(65) Prior Publication Data

US 2009/0259383 A1    Oct. 15, 2009

(51) Int. Cl.
*G01M 15/08* (2006.01)
(52) U.S. Cl. .................................................. 73/114.52
(58) Field of Classification Search ............... 73/114.02, 73/114.16, 114.17, 114.22, 114.27, 114.38, 73/114.52, 114.53
See application file for complete search history.

(56) References Cited

U.S. PATENT DOCUMENTS

| | | | | |
|---|---|---|---|---|
| 5,103,789 A | * | 4/1992 | Hartman et al. | 123/435 |
| 5,544,635 A | * | 8/1996 | Hara et al. | 123/406.26 |
| 6,089,077 A | * | 7/2000 | Daniels | 73/35.08 |
| 6,612,186 B1 | * | 9/2003 | Patten et al. | 73/861.04 |
| 6,915,776 B2 | | 7/2005 | zur Loye | |
| 7,246,597 B2 | | 7/2007 | Kuo | |
| 7,290,442 B2 | * | 11/2007 | Zhu et al. | 73/114.67 |
| 7,685,871 B2 | * | 3/2010 | Sinnamon | 73/114.69 |
| 2006/0042355 A1 | * | 3/2006 | Zhu et al. | 73/35.08 |
| 2008/0010973 A1 | * | 1/2008 | Gimbres | 60/276 |
| 2009/0235728 A1 | * | 9/2009 | Sinnamon | 73/118.02 |

FOREIGN PATENT DOCUMENTS

EP        1674702        6/2006

OTHER PUBLICATIONS

WO 2006/017051 Feb. 16, 2006.

* cited by examiner

*Primary Examiner*—Eric S McCall

(57) ABSTRACT

A method for diagnosing combustion within a direct-injection, internal combustion engine including a plurality of combustion chambers and operative lean of stoichiometry includes monitoring combustion in the combustion chambers and estimating mass fraction burn therein. Mass fraction burn of sequential ones of the plurality of combustion chambers are compared and combustion phasing differences between sequential ones of the plurality of combustion chambers based on said mass fraction burn comparisons are identified.

15 Claims, 3 Drawing Sheets

FUEL SYSTEM DIAGNOSTICS BY ANALYZING CYLINDER PRESSURE SIGNAL

TECHNICAL FIELD

This disclosure relates to operation and control of internal combustion engines, including compression-ignition engines.

BACKGROUND

The statements in this section merely provide background information related to the present disclosure and may not constitute prior art.

A variety of intrusive and non-intrusive pressure sensing means are known for sensing pressure within an internal combustion engine cylinder when the engine is motoring and when the engine is firing.

Combustion timing or phasing is useful to diagnose issues in the combustion process. Examining mass fraction burn is one known method to examine combustion phasing for a cylinder. Mass fraction burn is an estimate of how much of the charge within the combustion chamber of a cylinder has been combusted at a given crank angle. For a normal combustion process operated under a particular set of parameters, mass fraction burn is predictable to within a small range. Mass fraction burn values indicating deviation from this small range indicate that conditions within the combustion chamber are outside of the expected parameters. Mass fraction burn is estimated in a number of ways.

One known method to estimate mass fraction burn includes examining pressure data from within the combustion chamber, including analyzing the pressure rise within the chamber attributable to combustion. Various methods exist to quantify pressure rise in a cylinder attributable to combustion. Pressure ratio management (PRM) is a method based upon the Rassweiler approach, which states that mass fraction burn may be approximated by the fractional pressure rise due to combustion. Combustion of a known charge at a known time under known conditions tends to produce a consistently predictable pressure rise within the cylinder. PRM derives a pressure ratio from the ratio of a measured cylinder pressure under combustion at a given crank angle to a calculated motored pressure, estimating a pressure value if no combustion took place in the cylinder, at a given crank angle. Any rise in pressure above the motored pressure is attributable to energy introduced by combustion. This method therefore describes the combustion process within a cylinder, including combustion phasing information, and normalizing the pressure ratio value at a given crank angle to a completed combustion cycle yields a fractional pressure ratio estimating the mass fraction burn.

The Rassweiler approach may also be used directly to determine mass fraction burn. This approach quantifies the pressure rise in a combustion chamber attributable to combustion and sums the rise over a range of crank angles. This accumulated sum of pressure rise attributable to combustion over a present combustion cycle can be compared to an expected total to yield the fractional portion of the charge that has been combusted or the mass fraction burn.

Another method to estimate mass fraction burn is through classical heat release models based on the First Law of Thermodynamics. Known equations equate a rate of heat release in combustion to measured cylinder readings. Integration of this heat release rate yields a net energy release for a given crank angle. This net energy release may be compared to an expected energy release to yield the fractional portion of the charge that has been combusted or the mass fraction burn.

Compression-ignition engines and other engine control schemes operate over broad engine conditions. Effective control, including fuel control, fuel tailoring, charge ignition timing control, exhaust gas recirculation (EGR) control, is necessary to meet operator demands for performance and fuel economy and comply with emissions requirements. Furthermore, there is much variability, including that related to: components, e.g., fuel injectors; systems, e.g., fuel line and pressures; operating conditions, e.g., ambient pressures and temperatures; and, fuels, e.g., cetane number and alcohol content. The variability in combustion affects heat release and work output from individual cylinders, resulting in non-optimal performance of the engine. Any change in the engine performance is apparent in cylinder pressure ratios. A measure of combustion variability would be valuable to diagnose instability in the combustion process and providing information useful to reduce periods of inefficient or high emission operation.

SUMMARY

A method for diagnosing combustion within a direct-injection, internal combustion engine including a plurality of combustion chambers and operative lean of stoichiometry includes monitoring combustion in the combustion chambers and estimating mass fraction burn therein. Mass fraction burn of sequential ones of the plurality of combustion chambers are compared and combustion phasing differences between sequential ones of the plurality of combustion chambers based on said mass fraction burn comparisons are identified.

BRIEF DESCRIPTION OF THE DRAWINGS

One or more embodiments will now be described, by way of example, with reference to the accompanying drawings, in which.

DETAILED DESCRIPTION

Figure 1:
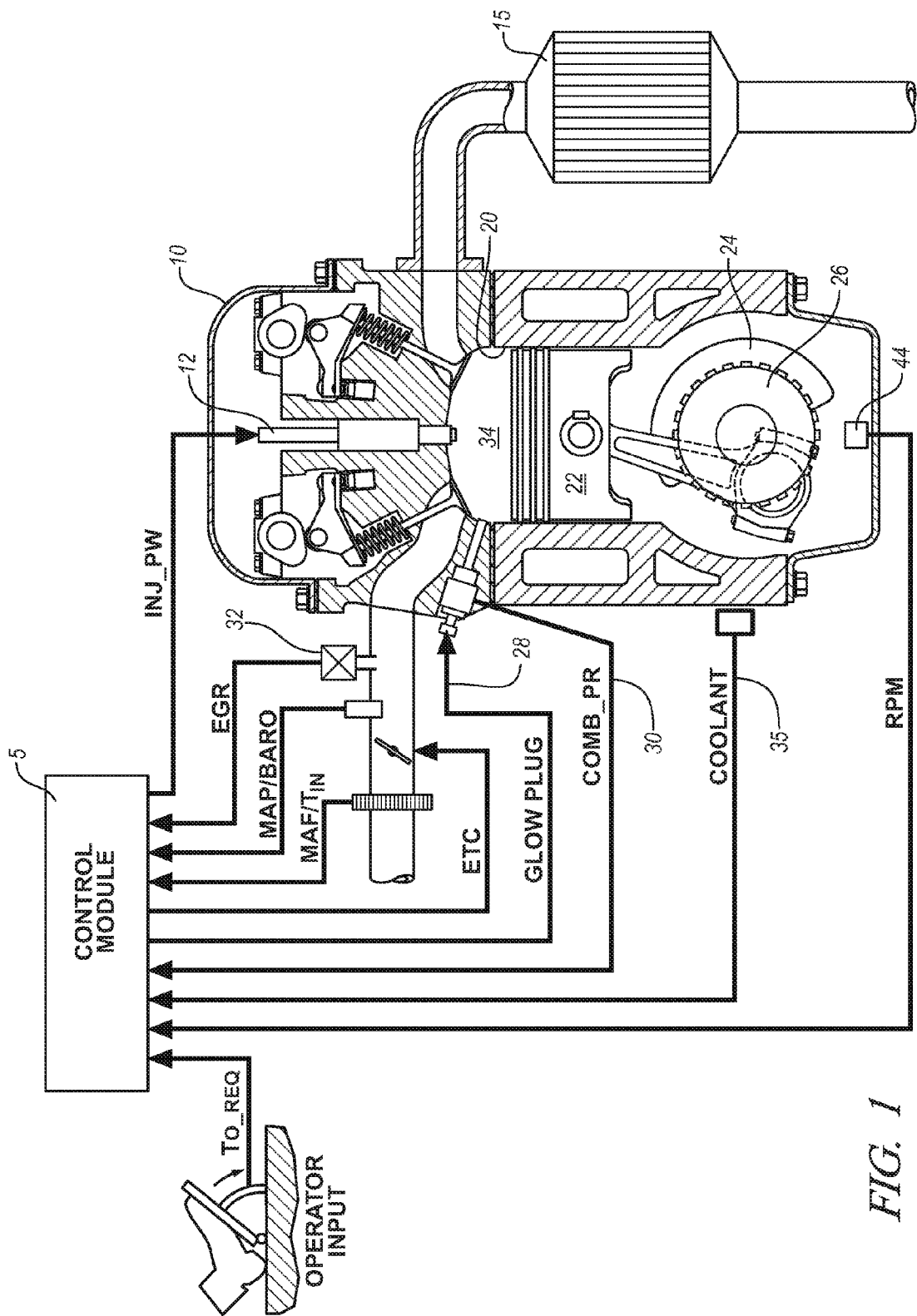
FIG. 1 is a sectional view of an internal combustion engine configured according to an exemplary embodiment of the disclosure.

Referring now to the drawings, wherein the showings are for the purpose of illustrating certain exemplary embodiments only and not for the purpose of limiting the same, FIG. 1 is a schematic diagram depicting an internal combustion engine 10, control module 5, and exhaust aftertreatment system 15, constructed in accordance with an embodiment of the disclosure. The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request (T$_{O\_REQ}$). The engine preferably employs a four-stroke operation wherein each engine combustion cycle comprises 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the multi-tooth target wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (COMB_PR). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature (T$_{IN}$), and, a coolant sensor 35 (COOLANT). The system may include an exhaust gas sensor (not shown) for monitoring states of one or more exhaust gas parameters, e.g., temperature, air/fuel ratio, and constituents. One skilled in the art understands that there may other sensing devices and methods for purposes of control and diagnostics. The operator input, in the form of the operator torque request, (T$_{O\_REQ}$), is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request (T$_{O\_REQ}$). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 is supplied pressurized fuel from a fuel distribution system (not shown), and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 preferably includes one or more general-purpose digital computers generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion cycle may be described as an estimated state of combustion. By estimating the state of the combustion process for a cylinder and comparing the state to either expected cylinder readings or to the readings of other cylinders, cylinders may be evaluated in terms of malfunctions, misfires, or inefficient operation. Such evaluations may be especially important in engines operating under HCCI or compression ignition, as small variations in cylinder conditions can interfere with conditions necessary to create efficient and orderly auto-ignition necessary to derive the benefits of efficiency, fuel economy, and low emissions evident in a properly functioning engine.

Figure 2:
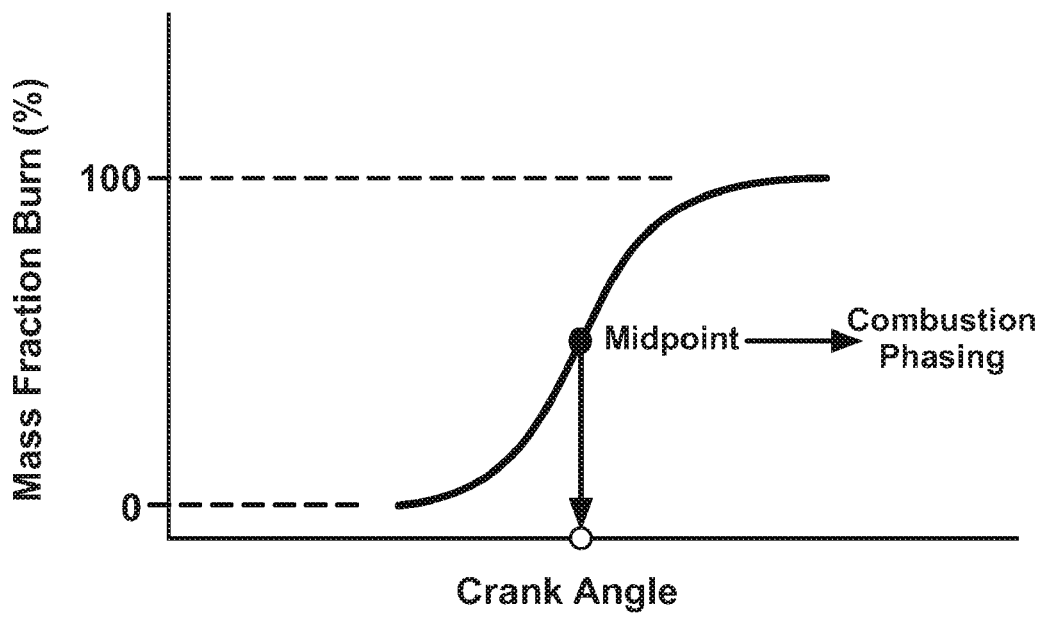
FIG. 2 is a graphical depiction of a mass fraction burn curve in accordance with the disclosure.

One known method for monitoring combustion phasing is to estimate the mass fraction burn ratio for a given crank angle based upon known parameters. The mass fraction burn ratio describes what percentage of the charge in the combustion chamber has been combusted and serves as a good estimate of combustion phasing. FIG. 2 illustrates an exemplary mass fraction burn curve. For a given crank angle, the curve depicted describes the estimated percentage of fuel air mixture within the charge that has been combusted for that combustion cycle. In order to be used as a metric of combustion phasing, it is known to identify either a particular mass fraction burn percentage of interest or a particular crank angle of interest. FIG. 2 identifies CA50% as a crank angle at which the mass fraction burn equals 50%. By examining this particular metric across a plurality of combustion cycles in this cylinder or across a number of cylinders, the comparative phasing of the particular combustion cycles may be described.

As described above, combustion phasing can be utilized to estimate the state of a particular combustion cycle. An exemplary method for monitoring combustion phasing to diagnose ineffective combustion is disclosed whereby combustion in an engine is monitored, mass fraction burn ratios are generated for each cylinder combustion cycle, and the combustion phasing across the cylinders are compared. If the combustion phase for one cylinder at a particular crank angle for that first cylinder differs by more than a threshold phase difference from the combustion phase for another cylinder at the same crank angle for that second cylinder, anomalous combustion can be inferred. Many sources of anomalous combustion may be diagnosed by this method. For example, if some condition causes early ignition or knocking within the combustion chamber, the cylinder pressure readings will exhibit different values than normal combustion. Additionally, fuel system injection timing faults, causing injection of the charge at incorrect timing, will cause anomalous cylinder pressure readings. Further, if a cylinder misfires or never achieves combustion, the cylinder pressure readings will exhibit different values than normal combustion. Similarly, pressure curves may be used to diagnose other abnormal combustion conditions, such as changes in the air fuel mixture, changes in camshaft phasing, and maintenance failures to related components.

Many methods are known to estimate mass fraction burn. One method examines pressure data from within the combustion chamber, including analyzing the pressure rise within the chamber attributable to combustion. Various methods exist to quantify pressure rise in a cylinder attributable to combustion. Pressure ratio management (PRM) is a method based upon the Rassweiler approach, which states that mass fraction burn may be approximated by the fractional pressure rise due to combustion. Combustion of a known charge at a known time under known conditions tends to produce a consistently predictable pressure rise within the cylinder. PRM derives a pressure ratio (PR) from the ratio of a measured cylinder pressure under combustion at a given crank angle ($P_{CYL}(\theta)$) to a calculated motored pressure, estimating a pressure value if no combustion took place in the cylinder, at a given crank angle ($P_{MOT}(\theta)$), resulting in the following equation:

$$PR(\theta) = \frac{P_{CYL}(\theta)}{P_{MOT}(\theta)} \quad (1)$$

Figure 3:
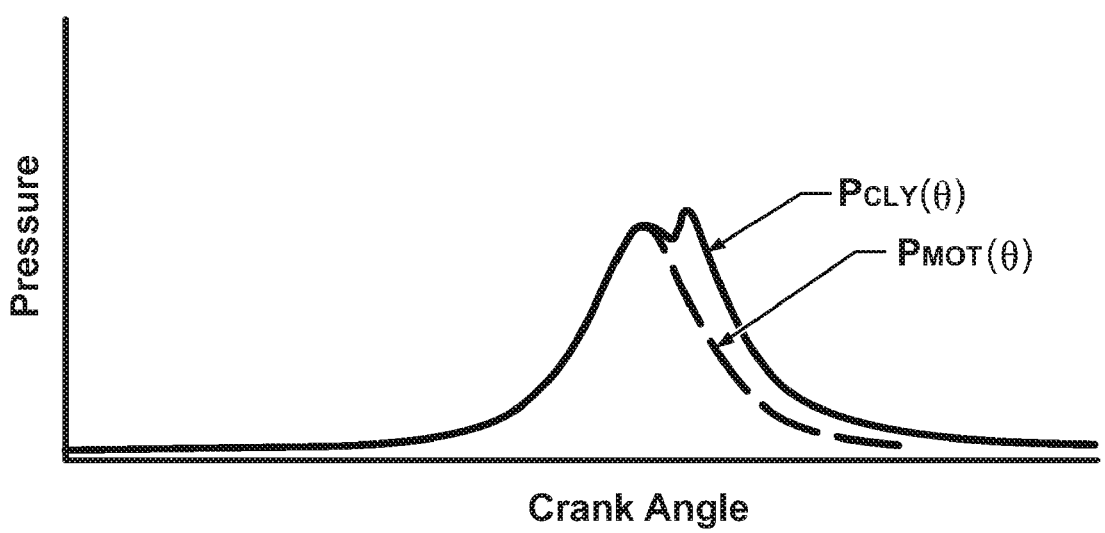
FIG. 3 is a graphical depiction of exemplary pressures observable within a combustion chamber during a compression/expansion event, including cylinder pressure common to a combustion cycle and motored pressure common to a cylinder cycled without combustion, in accordance with the disclosure.

Referring to FIG. 3, cylinder pressure is plotted against crank angle through a combustion cycle. $P_{MOT}(\theta)$ exhibits a smooth, inverse parabolic peak from the piston compressing a trapped pocket of gas without any combustion. All valves are closed with the piston at BDC, the piston rises compressing the gas, the piston reaches TDC at the peak of the pressure curve, and the pressure reduces as the piston falls away from TDC. A rise in pressure above $P_{MOT}(\theta)$ is depicted by $P_{CYL}$ (θ). The timing of combustion will vary from application to application. In this particular exemplary curve, $P_{CYL}(\theta)$ begins to rise from $P_{MOT}(\theta)$ around TDC, describing an ignition event sometime before TDC. As the charge combusts, heat and work result from the combustion, resulting in an increase in pressure within the combustion chamber. PR is a ratio of $P_{MOT}$ to $P_{CYL}$, and $P_{MOT}$ is a component of $P_{CYL}$. Net combustion pressure (NCP(θ)) is the difference between $P_{CYL}(\theta)$ and $P_{MOT}(\theta)$ or the pressure rise in the combustion chamber attributable to combustion at a given crank angle. It will be appreciated that by subtracting one from PR, a ratio of NCP to $P_{MOT}$ may be determined.

$$PR(\theta) - 1 = \frac{P_{CYL}(\theta)}{P_{MOT}(\theta)} - \frac{P_{MOT}(\theta)}{P_{MOT}(\theta)} = \frac{NCP(\theta)}{P_{MOT}(\theta)} \quad (2)$$

PR measured through the equation above therefore may be used to directly describe the strength of combustion within a cylinder. Normalizing PR minus one at crank angle θ to an expected or theoretical maximum PR value minus one yields a fractional pressure ratio of the pressure rise due to combustion at crank angle θ to the expected total pressure rise due to combustion at the completion of the combustion cycle. This normalization can be expressed by the following equation:

$$FPR(\theta) = \frac{PR(\theta) - 1}{PR(90°.) - 1} \propto MassFractionBurn(\theta) \quad (3)$$

This fractional pressure ratio, by equating pressure rise attributable to combustion to the progression of combustion, describes the mass fraction burn for that particular combustion cycle. By utilizing PRM, pressure readings from a cylinder may be used to estimate mass fraction burn for that cylinder.

The above method utilizing PRM is applicable for broad ranges of temperature, cylinder charge and timings associated with compression ignition engines, with the added benefit of not requiring calibrated pressure sensors. Because PR is a ratio of pressures, a non-calibrated linear pressure transducer may be utilized to acquire pressure data readings from each cylinder.

Another method to estimate mass fraction burn is to directly utilize the Rassweiler approach to determine mass fraction burn by calculating the total heat released for a given crank angle. The Rassweiler approach utilizes pressure readings from a cylinder to approximate the incremental heat release in the cylinder. This approach is given by the following equation:

$$Q_{Released}(\theta) = \sum P_{k-1} - P_{k-1}\left(\frac{V_{k-1}}{V_k}\right)^r \quad (4)$$

Mass fraction burn, a measure of how much of the charge has been combusted by a certain crank angle, may be approximated by determining what fraction of heat release for a combustion cycle has taken place at a given crank angle. The incremental heat release determined by the Rassweiler approach may be summed over a range of crank angles, compared to the total expected or theoretical heat release for the combustion cycle, and utilized to estimate mass fraction burn. For example, if 75% of the total expected heat release has been realized for a given crank angle, we can estimate that 75% of the combustion for the cycle has taken place at that crank angle.

Other methods may be used to estimate mass fraction burn. One method quantifies the rate of change of energy within the combustion chamber due to combustion through an analysis of classical heat release measures based on analysis of the heat released and work performed through the combustion of the charge. Such analyses are focused on the First Law of Thermodynamics, which states that the net change on energy in a close system is equal to the sum of the heat and work added to the system. Applied to a combustion chamber, the energy increase in the combustion chamber and the enclosed gases equals the heat transferred to the walls of the chamber and the gases plus the expansive work performed by the combustion.

An exemplary method utilizing these classic heat release measures to approximate a mass fraction burn estimate analyzes the rate of heat release by charge combustion throughout combustion cycle. This rate of heat release, $dQ_{ch}/d\theta$, may be integrated over a range of crank angles in order to describe the net energy released in the form of heat. Through derivations well known in the art, this heat release may be expressed through the following equation:

$$Q = \int \frac{dQ_{ch}}{d\theta} = \int \left(\frac{\gamma}{\gamma-1} p \frac{dV}{d\theta} + \frac{1}{\gamma-1} V \frac{dp}{d\theta}\right) \quad (5)$$

Gamma, γ, comprises a ratio of specific heats and is nominally chosen as that for air at the temperature corresponding to those used for computing the signal bias and without EGR. Thus, nominally or initially γ=1.365 for diesel engines and nominally γ=1.30 for conventional gasoline engines. These can however be adjusted based on the data from the specific heats for air and stoichiometric products using an estimate of the equivalence ratio, φ, and EGR molar fraction targeted for the operating condition and using the relation that $[\gamma=1+(R/c_v)]$, wherein R is the universal gas constant, and the weighted average of air and product properties through the expression:

$$c_v(T) = (1.0 - \phi*EGR)*c_{vair}(T) + (\phi*EGR)*c_{vstoichprod}(T) \quad (6)$$

With the expression evaluated at the gas temperature corresponding to that for pressures sampled for the computation of signal bias.

Whether calculated through the preceding method or by some other method known in the art, the calculation of energy released within the combustion cycle for a given crank angle may be compared to an expected or theoretical total energy release for the combustion cycle. This comparison yields an estimate of mass fraction burn for use in describing combustion phasing.

The methods described hereinabove are readily reduced to be programmed into a microcontroller or other device for execution during ongoing operation of an internal combustion engine, as follows.

Once a mass fraction burn curve is generated for a particular combustion cycle, the curve is useful to evaluate the combustion phasing for that particular combustion cycle. Referring again to FIG. 2, a reference point is taken from which to compare mass fraction burn estimates from difference combustion cycles. In this particular embodiment, CA50%, representing the crank angle at which 50% of the charge is combusted, is selected. Other measures can be selected so long as the same measure is used for every comparison.

Determination of mass fraction burn values is a practice well known in the art. Although exemplary methods are described above for determining mass fraction burn, the methods disclosed herein to utilize mass fraction burn values to diagnose cylinder combustion issues may be used with any method to determine mass fraction burn. Any practice for developing mass fraction burn may be utilized, and this disclosure is not intended to be limited to the specific methods described herein.

Once mass fraction burn estimates are available, analyses may be run to diagnose any issues made evident by the combustion phases of each cylinder. As mentioned above, an exemplary method for monitoring combustion phasing to diagnose ineffective combustion is described whereby combustion in an engine is monitored, mass fraction burn values are generated for each cylinder combustion cycle, and combustion phasing measures across the cylinders are compared. If the combustion phase for one cylinder at a particular crank angle for that first cylinder differs by more than a threshold phase difference from the combustion phase for another cylinder at the same crank angle for that second cylinder, then an indication is generated that anomalous combustion has occurred. Comparisons between CA50% values for neighboring cylinders generate phase difference values $\Delta_n$, measured in degrees. It will be appreciated that in terms relevance to combustion, a cylinder is said to neighbor another cylinder if it is next in order in the ignition firing sequence and has nothing to do with physical location on the engine block.

Figure 4:
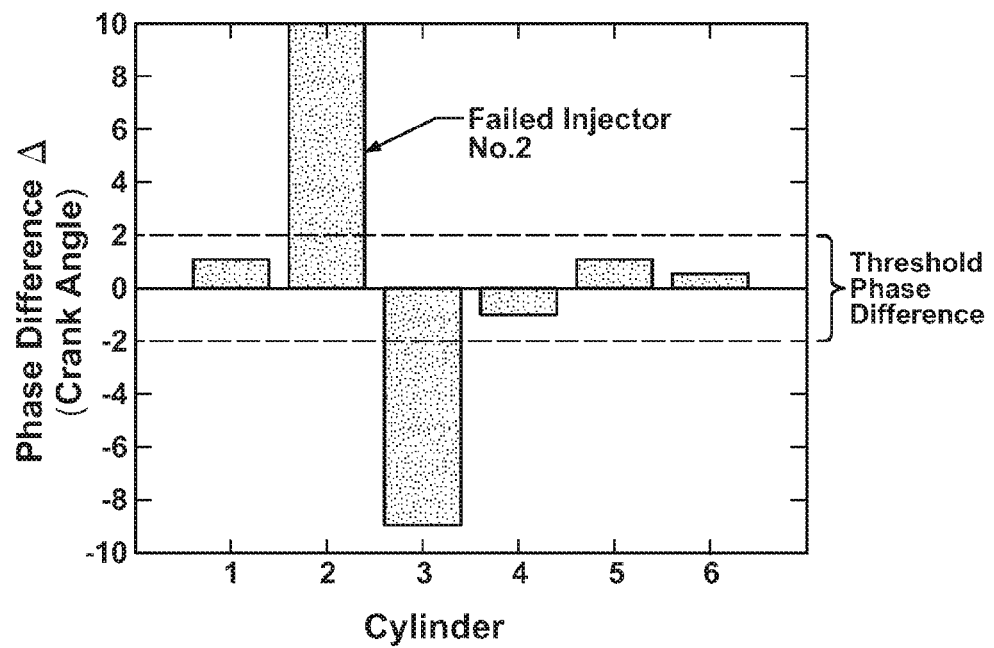
FIG. 4 is a graphical depiction of an exemplary comparison of crank angle values associated with mass fraction burn at fifty percent across a group of sequential cylinders in accordance with the disclosure.
Figure 5:
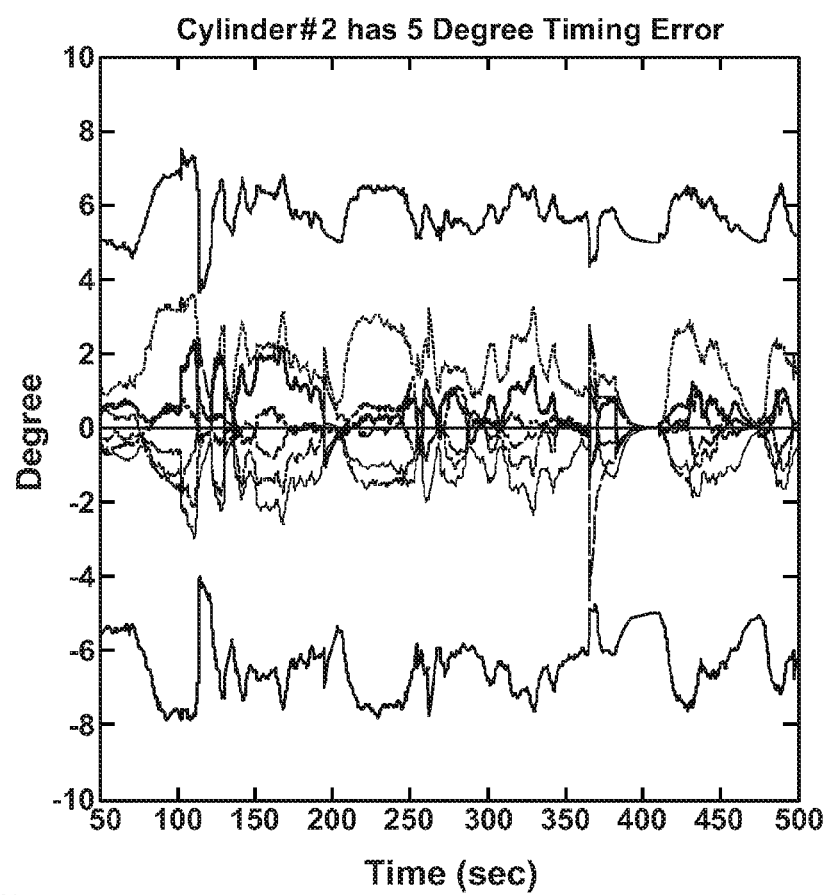
FIG. 5 is a graphical depiction of exemplary comparisons of crank angle values associated with mass fraction burn at fifty percent across a group of sequential cylinders over a duration of engine cycles in accordance with the disclosure.

FIG. 4 illustrates a comparison of CA50% values for a six cylinder engine through a set of sequential combustion cycles in accordance with the disclosure. $\Delta_n$, is depicted for each comparison, where $\Delta_1$=CA50% (2)−CA50% (1); $\Delta_2$=CA50% (3)−CA50% (2); $\Delta_3$=CA50% (4)−CA50% (3); $\Delta_4$=CA50% (5)−CA50% (4); $\Delta_5$=CA50% (6)−CA50% (5); $\Delta_6$=CA50% (1)−CA50% (6). In these equations, CA50% (1) is the crank angle at which the first cylinder in the ignition sequence reaches a mass fraction burn of 50% in the present combustion cycle; CA50% (2) is the crank angle at which the second cylinder in the ignition sequence reaches a mass fraction burn of 50% in the present combustion cycle; etc. A threshold phase difference of two crank angle degrees is selected and identified in both the positive and negative phase difference zones. This value is selected experimentally, empirically or predictively, through modeling or other techniques in order to adequately identify when abnormal combustion is taking place within a cylinder without issuing false alarms due to normal variation between cylinders caused by such variables as manufacturing tolerances, normal wear upon the engine, and transient engine conditions. In this particular test, $\Delta_1$ is an acceptable value under the threshold phase difference. $\Delta_2$, however is in excess of the threshold phase difference and indicates an abnormal combustion event indicating that cylinder two has an issue. $\Delta_3$ is in excess of the threshold phase difference; however, it is in comparison to the abnormal reading of $\Delta_2$. This failure in $\Delta_3$ can be filtered out as being caused by the abnormal $\Delta_2$ reading. The remainder of the $\Delta_2$ readings are normal. A warning could be indicated for the abnormal $\Delta_2$ reading, or a warning might only be indicated if the abnormal reading occurs a certain number of times or with certain regularity. Alternatively, more complex algorithms could be run on the data to identify long term trends in the cylinder behaviors. FIG. 5 illustrates $\Delta_n$ readings over a large number of cycles. Here, it can be seen that most $\Delta_n$ values hover between four and minus four. However, one value clearly exists centered around six, and a corresponding value clearly exists around minus six. As discussed above, one of these values is likely due to faulty combustion, and the other value is likely due to being compared with the faulty cylinder. Long term analysis of this data could examine these trends and identify the faulty cylinder involved.

In addition, $\Delta$ values may be generated and compared between non-neighboring cylinders to augment or confirm the above method. For example, in this particular set of engine data, information from cylinder 1 and cylinder 3 could be compared either as part of an automatic, full-time check or as prompted by the faulty $\Delta_2$ reading in excess of the threshold phase difference. Such a comparison will confirm that the combustion phase of cylinder 3 is within normal range of cylinder 1, and that the reading $\Delta_3$ in excess of the threshold phase difference was actually due to the faulty $\Delta_2$ reading.

Warnings issued due to an identified combustion issue or faulty cylinder may take many forms, including but not limited to a warning light indication, an audible tone or message, a display on a driver interface device, or a message relayed over a communications network. Alternatively, error messages or fault tallies not deemed to be critical could be recorded in a memory storage device, preferably communicably connected to or unitary with the above mentioned control module 5, for review by maintenance personnel without alerting the driver.

The above described methods for estimating mass fraction burn can be applied with increased sample resolution to improve accuracy or be applied with relatively low resolution for less demanding signal processing and convenience for crank angle encoder hardware. Additionally, the methods are applicable to spark-ignition engines, including those using homogeneous charge compression ignition strategies. The methods are applicable to systems utilizing multiple fuel injection events per cylinder event.

Pressure sensing devices for methods utilizing PRM or Rassweiler based methods are preferably low-cost sensors, such as linear pressure transducers, not requiring detailed calibration processes and are installed in the engine to monitor in-cylinder pressure in each of the cylinders during ongoing operation. Pressure sensors for use with methods utilizing classical heat release measures usually involve both linear pressure transducers as mentioned above and, additionally, calibrated pressure transducers requiring more detailed calibration, zeroing and trimming to insure accuracy. In operation, in-cylinder pressures are monitored along with a corresponding engine crank position to determine instantaneous in-cylinder pressure states corresponding to the engine crank position, especially of interest during the compression and expansion strokes. Pressure ratios are calculated based upon the instantaneous in-cylinder pressure states, preferably at each measurement of cylinder pressure.

The control module 5 mentioned above is adapted to monitor cylinder pressures and engine operating conditions from the aforementioned sensors, preferably and execute program code to determine the combustion timing and strength. Control module 5 acts to determines instantaneous control settings for fuel injection mass and timing, EGR valve position, and, intake and exhaust valve phasing and lift set points, and other control parameters, from lookup tables and control schemes executed as program code in one of the memory devices. With the combustion sensing occurring each six degrees of elapsed crankshaft rotation, the control module executes algorithms to measure pressure ratios, determine combustion heat, and estimate the mass fraction burn for each elapsed incremental rotation of the crankshaft. These mass fraction burn estimates are then available for the above mentioned methods to diagnose cylinder combustion issues.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for diagnosing combustion within a direct-injection, internal combustion engine including a plurality of combustion chambers and operative lean of stoichiometry, the method comprising:
monitoring combustion in the plurality of combustion chambers;
estimating mass fraction burn in the plurality of combustion chambers;
comparing said mass fraction burn of sequential ones of the plurality of combustion chambers; and
identifying combustion phasing differences between sequential ones of the plurality of combustion chambers based on said mass fraction burn comparisons.

2. The method of claim 1, wherein estimating a mass fraction burn comprises:
measuring cylinder pressure within one of said plurality of combustion chambers across a range of crank angles;
calculating from said cylinder pressure a pressure ratio of a net combustion pressure versus a motored pressure across said range of crank angles; and
normalizing said pressure ratio to an estimated complete combustion pressure ratio to estimate said mass fraction burn.

3. The method of claim 2, wherein calculating a pressure ratio comprises:
subtracting said motored pressure from said cylinder pressure to determine said net combustion pressure; and
dividing said net combustion pressure by said motored pressure.

4. The method of claim 2, wherein said estimated complete combustion pressure ratio is estimated as a cylinder pressure at ninety degrees post top dead center divided by a motored pressure at ninety degrees post top dead center.

5. The method of claim 1, wherein estimating mass fraction burn comprises:
measuring cylinder pressure readings within one of said plurality of combustion chambers across a range of crank angles;
determining for each cylinder pressure reading a respective net combustion pressure;
calculating respective elemental energy releases based on said net combustion pressures;
summing said elemental energy releases to generate a fractional energy release; and
comparing said fractional energy release to an expected total energy release to estimate said mass fraction burn.

6. The method of claim 1, wherein estimating mass fraction burn comprises:
measuring cylinder pressure within one of said plurality of combustion chambers across a range of crank angles;
estimating a rate of energy release across said range of crank angles;
integrating said rate of energy release across said range of crank angles to generate a fractional energy release; and
comparing said fractional energy release to an expected total energy release to estimate said mass fraction burn.

7. The method of claim 1, wherein comparing said mass fraction burn of sequential ones of the plurality of combustion chambers comprises:
identifying crank angles for each of said plurality of combustion chambers at which a predetermined fraction of combustion charge has been combusted based on corresponding combustion mass fraction burns; and
comparing the identified crank angles of sequential ones of the plurality of combustion chambers.

8. The method of claim 7, wherein said predetermined fraction is fifty percent.

9. The method of claim 7, wherein said predetermined fraction is twenty percent.

10. The method of claim 1, wherein comparing said mass fraction burn of sequential ones of the plurality of combustion chambers comprises:
identifying fractions of combustion charge that have been combusted at a particular crank angle based on corresponding mass fraction burns; and
comparing the identified fractions of sequential ones of the plurality of combustion chambers.

11. The method of claim 1, further comprising comparing said mass fraction burn of non-sequential ones of the plurality of combustion chambers.

12. The method of claim 1, further comprising determining long term combustion trends for said engine based on said mass fraction burn comparisons.

13. An apparatus for diagnosing combustion within a direct-injection engine operative lean of stoichiometry, comprising:
a plurality of combustion chambers;
a pressure transducer in communication with each of said plurality of combustion chambers; and
a control module in communication with said pressure transducers, said control module configured to:
analyze data from said pressure transducers to generate combustion phase information for each of said plurality of combustion chambers; and
compare combustion phase information for sequential ones of said plurality of combustion chambers.

14. The apparatus of claim 13, wherein said control module generates said combustion phase information for each of said plurality of combustion chambers in the form of mass fraction burn curves.

15. The apparatus of claim 13, wherein said control module generates said combustion phase information for each of said combustion chambers by determining a fractional energy release, comparing said fractional energy release to an expected total energy release, and estimating said mass fraction burn curve based on said comparison.

* * * * *